US011216470B1

(12) United States Patent
Lei

(10) Patent No.: US 11,216,470 B1
(45) Date of Patent: Jan. 4, 2022

(54) METHOD, APPARATUS, AND COMPUTER PROGRAM PRODUCT FOR EXTENDING AN ACTION VECTOR

(71) Applicant: Groupon, Inc., Chicago, IL (US)

(72) Inventor: Jikai Lei, Foster City, CA (US)

(73) Assignee: Groupon, Inc., Chicago, IL (US)

(*) Notice: Subject to any disclaimer, the term of this patent is extended or adjusted under 35 U.S.C. 154(b) by 350 days.

(21) Appl. No.: 16/033,956

(22) Filed: Jul. 12, 2018

Related U.S. Application Data

(60) Provisional application No. 62/531,756, filed on Jul. 12, 2017.

(51) Int. Cl.
*G06F 16/00* (2019.01)
*G06F 16/2457* (2019.01)
*G06F 16/28* (2019.01)
*G06F 16/951* (2019.01)

(52) U.S. Cl.
CPC ...... *G06F 16/24578* (2019.01); *G06F 16/285* (2019.01); *G06F 16/951* (2019.01)

(58) Field of Classification Search
CPC . G06F 16/24578; G06F 16/285; G06F 16/951
See application file for complete search history.

*Primary Examiner* — Neveen Abel Jalil
*Assistant Examiner* — Paul Kim
(74) *Attorney, Agent, or Firm* — Alston & Bird LLP

(57) ABSTRACT

Embodiments of the present invention provide methods, systems, apparatuses, and computer program products for extending an action vector. In one embodiment, an apparatus is configured to scan each client action vector cell of the client action vector to identify an empty client action vector cell, the client action vector associated with a client profile; upon identifying an empty client action vector cell, extract an empty client action vector cell device rendered object category; retrieve, from a similarity table, a similarity measure for each of the other device rendered object categories of the plurality of device rendered object categories, the similarity measure being in comparison to the empty client action vector cell device rendered object category; for each of the other device rendered object categories of the plurality of device rendered object categories having a similarity measure above a similarity threshold, extract an action count from the client action vector cell associated with the device rendered object category; compute a similarity action measure for the device rendered object category based at least on the action count and the similarity measure; and compute an action measure for the empty client action vector cell using at least one of the similarity action measures; and increment an action count in the empty client action vector cell based on the action measure.

24 Claims, 12 Drawing Sheets

METHOD, APPARATUS, AND COMPUTER PROGRAM PRODUCT FOR EXTENDING AN ACTION VECTOR

The present application claims priority to U.S. Provisional Patent Application Ser. No. 62/531,756, titled "METHOD, APPARATUS, AND COMPUTER PROGRAM PRODUCT FOR EXTENDING AN ACTION VECTOR," filed Jul. 12, 2017, the contents of which are incorporated herein by reference in their entirety.

BACKGROUND

Client devices submit search queries and may interact with device rendered objects returned within the search results, the device rendered objects associated with device rendered object categories. A client device may tend to interact with device rendered objects associated with only a subset of device rendered object categories, making a vector containing data representing interaction activity by the client device across all device rendered object categories sparse. Through applied effort, ingenuity, and innovation, many of these identified problems have been solved by developing solutions that are included in embodiments of the present invention, many examples of which are described in detail herein.

SUMMARY

This specification relates to extending a client action vector. In one embodiment, a computing entity or apparatus is configured to scan each client action vector cell of the client action vector to identify an empty client action vector cell, the client action vector associated with a client profile; upon identifying an empty client action vector cell, extract an empty client action vector cell device rendered object category; retrieve, from a similarity table, a similarity measure for each of the other device rendered object categories of the plurality of device rendered object categories, the similarity measure being in comparison to the empty client action vector cell device rendered object category; for each of the other device rendered object categories of the plurality of device rendered object categories having a similarity measure above a similarity threshold, extract an action count from the client action vector cell associated with the device rendered object category; compute a similarity action measure for the device rendered object category based at least on the action count and the similarity measure; and compute an action measure for the empty client action vector cell using at least one of the similarity action measures; and increment an action count in the empty client action vector cell based on the action measure.

Other embodiments include corresponding systems, methods, and computer programs, configured to perform the operations of the apparatus, encoded on computer storage devices. These and other embodiments can each optionally include one or more of the following features: generating the client action vector by receiving a device rendered object interaction signal from a client device associated with a client profile, wherein the device rendered object interaction signal is indicative of the client device having selected a device rendered object; extracting a first device rendered object category from the device rendered object; and incrementing an action count in a client action vector cell associated with the first device rendered object category.

Other embodiments can each optionally include generating the similarity table, wherein the similarity table comprises a plurality of similarity cells, wherein the similarity table has a plurality of columns, each column associated with a different device rendered object category of the plurality of device rendered object categories, wherein the similarity table has a plurality of rows, each row associated with a different search query, and wherein each device rendered object category column contains a row for every search query and each search query row contains a column for every device rendered object category.

Other embodiments can each optionally include generating the similarity table by receiving a plurality of search queries from a plurality of client devices; for each received search query, generating a search query row, upon receiving a device rendered object interaction signal associated with the search query, extracting a device rendered object category; and incrementing a similarity cell count in a cell associated with both the search query and the device rendered object category.

Other embodiments can each optionally included extracting each column of the similarity table and the device rendered object interaction category associated therewith; calculating a similarity measure for each column between the column and the other columns of the similarity table; and assigning similarity measures to the device rendered object categories wherein a similarity measure is associated with a pair of categories.

Other embodiments can each optionally include calculating the similarity measure using a cosine similarity.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
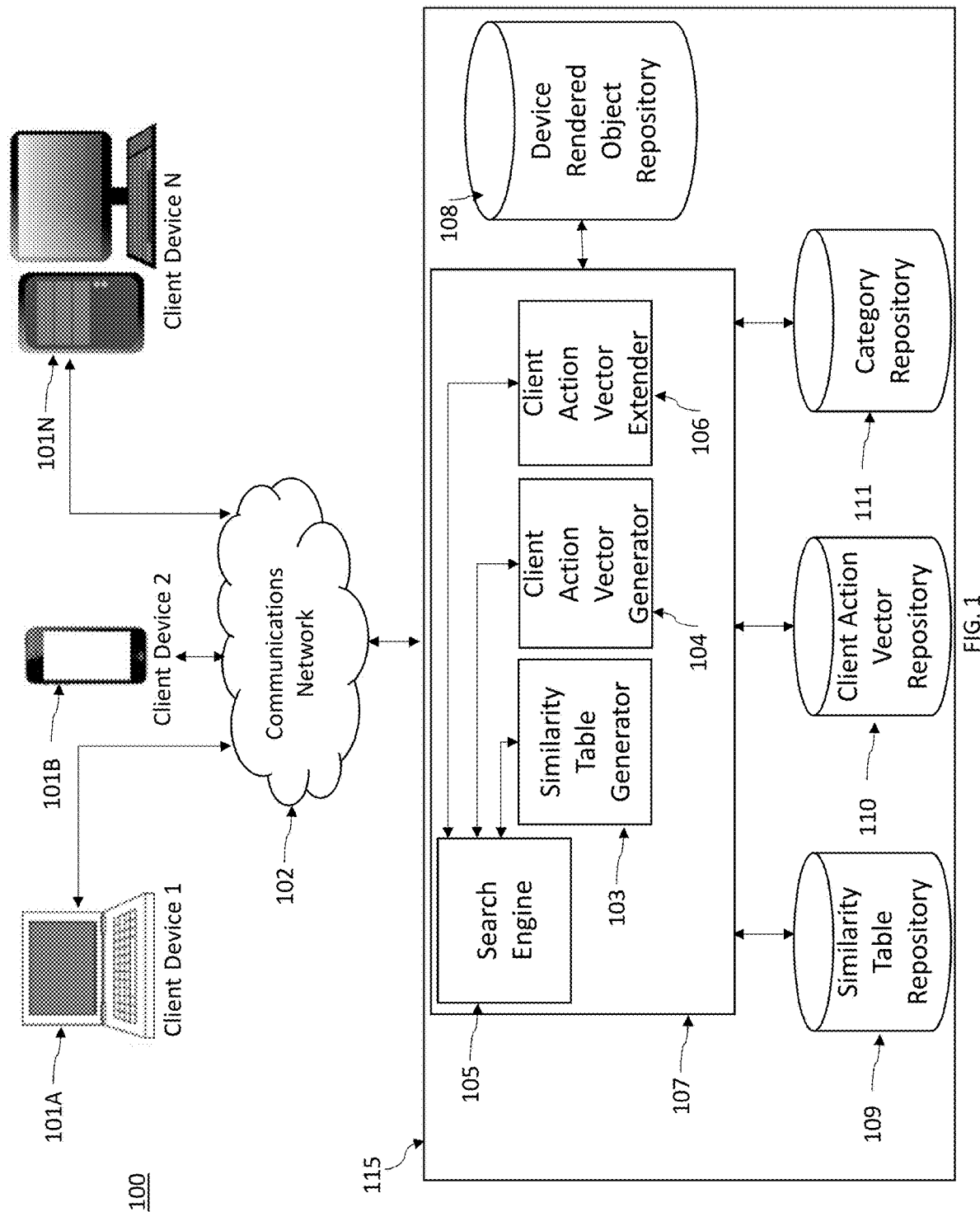
Figure 2:
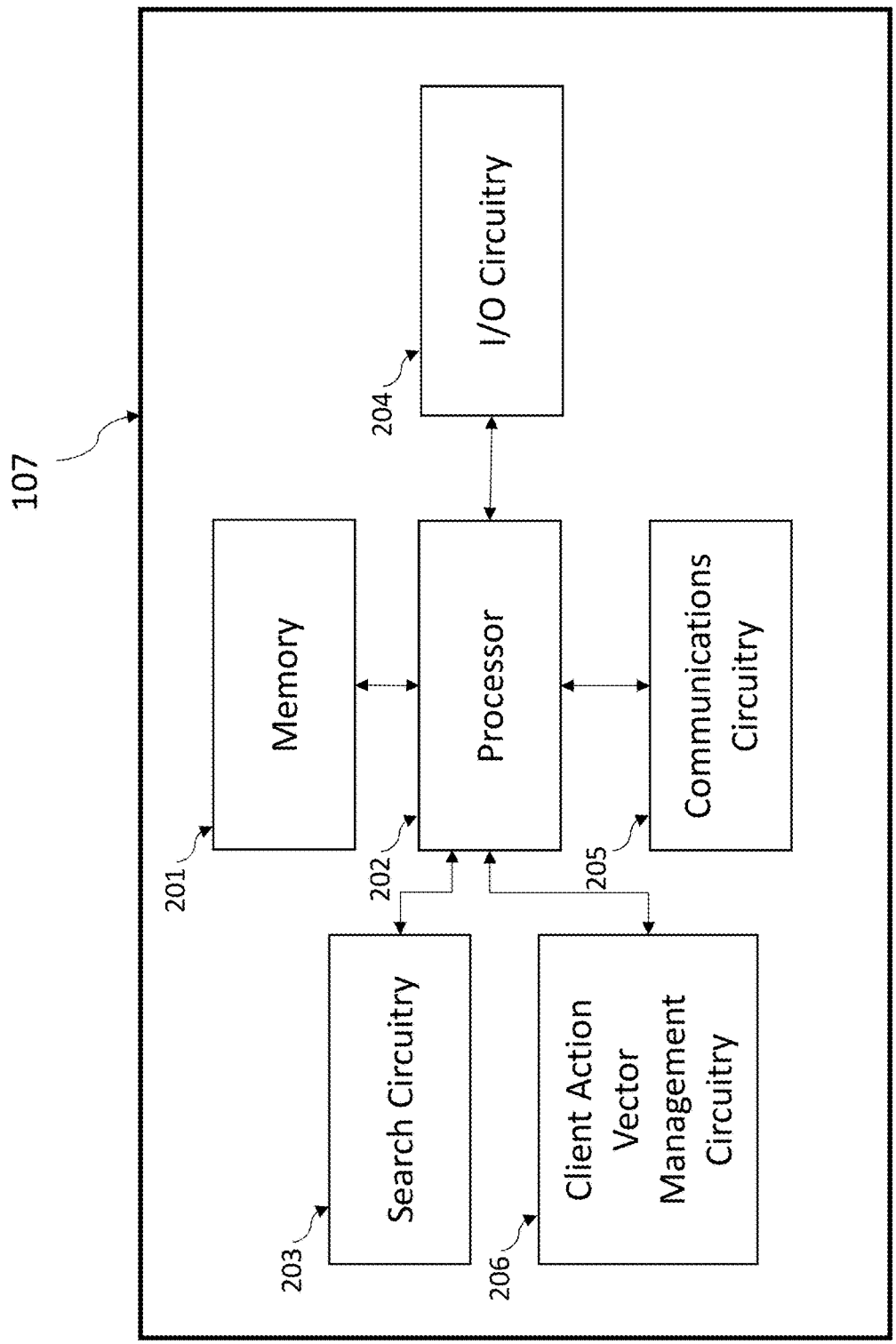
Figure 3:
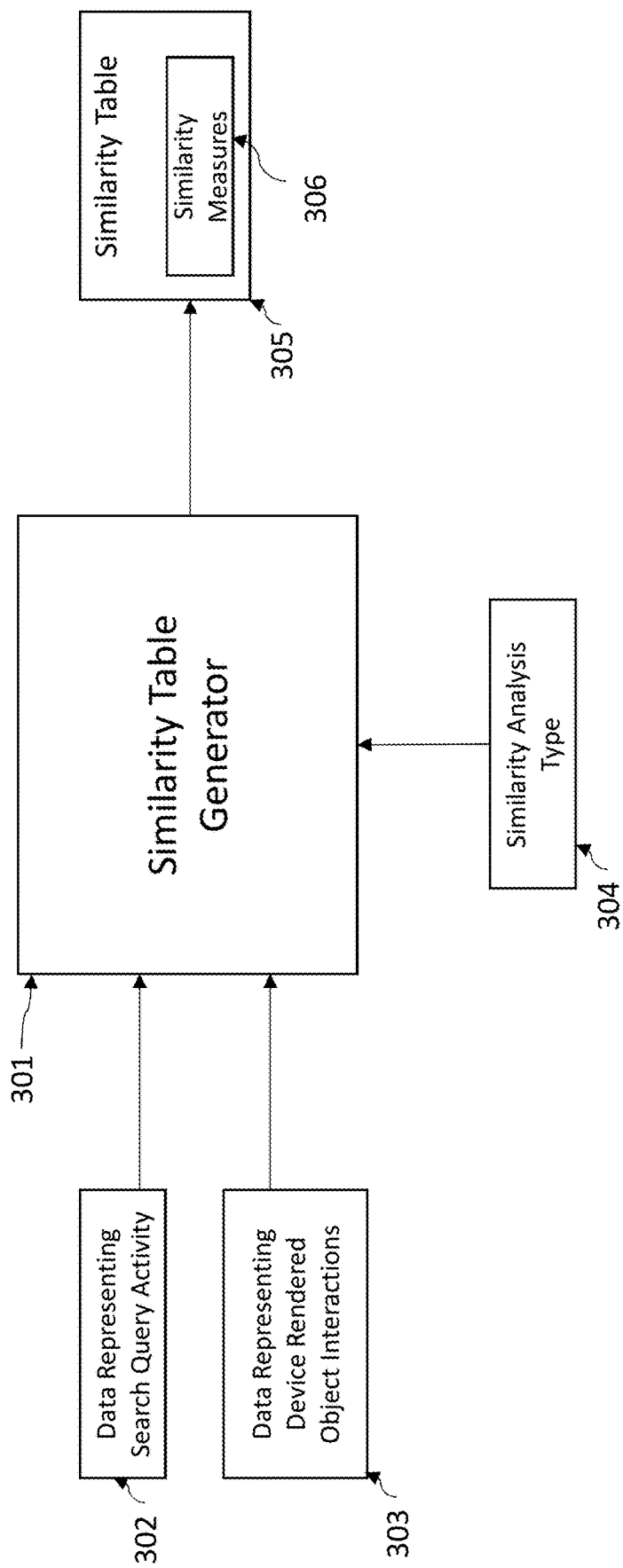
Figure 4:
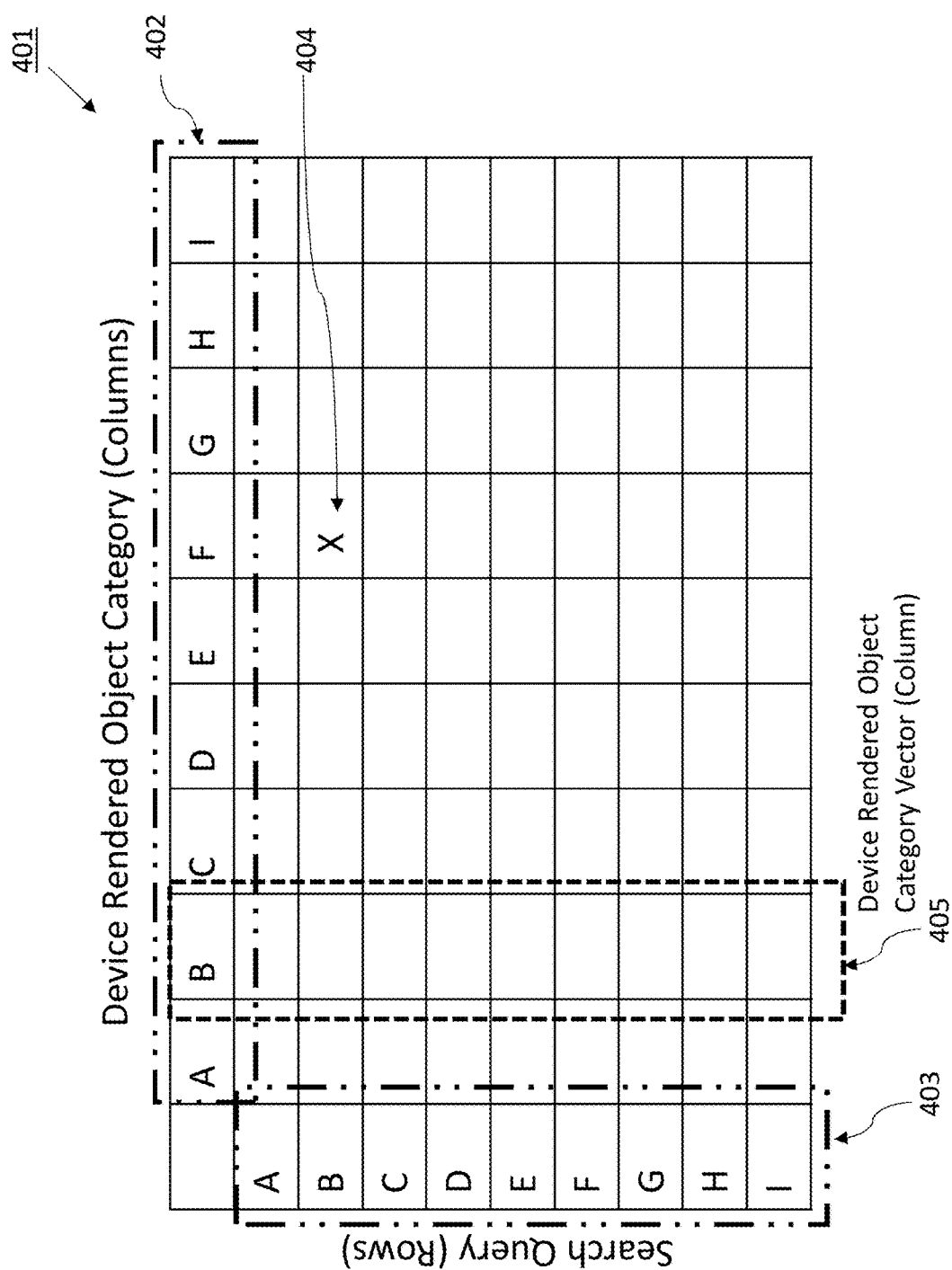
Figure 5:
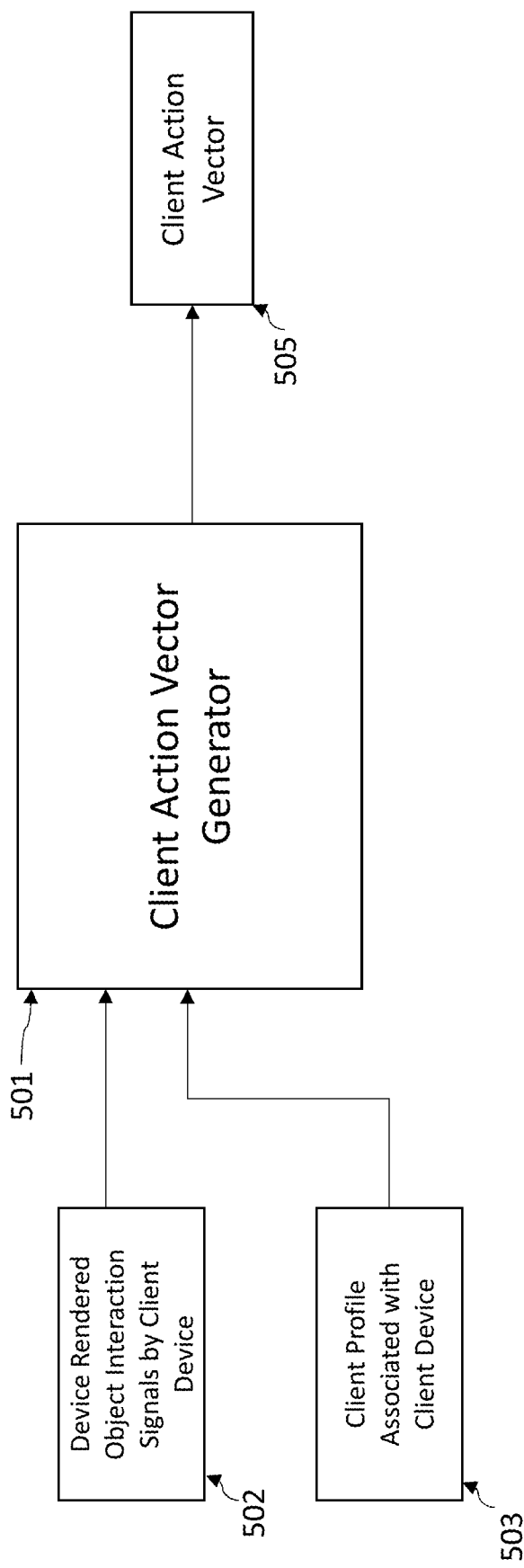
Figure 6:
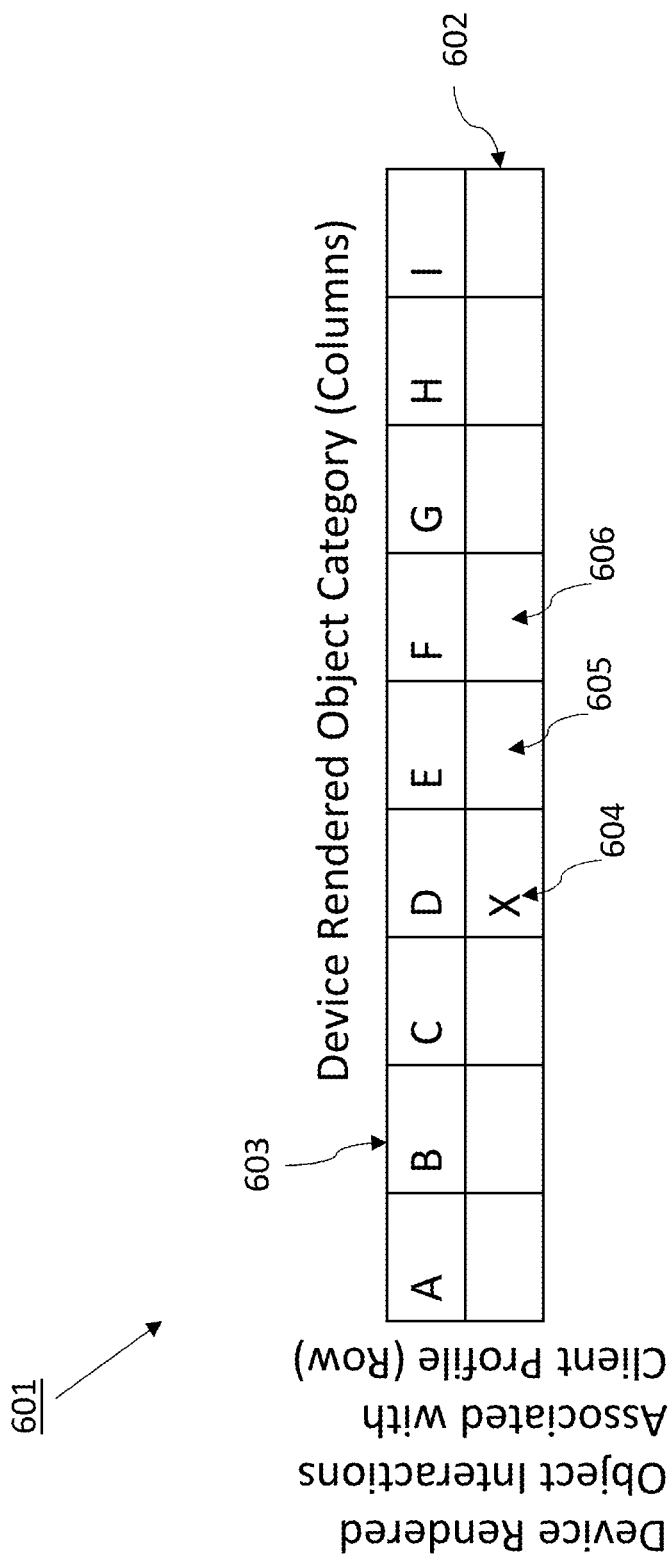
Figure 7:
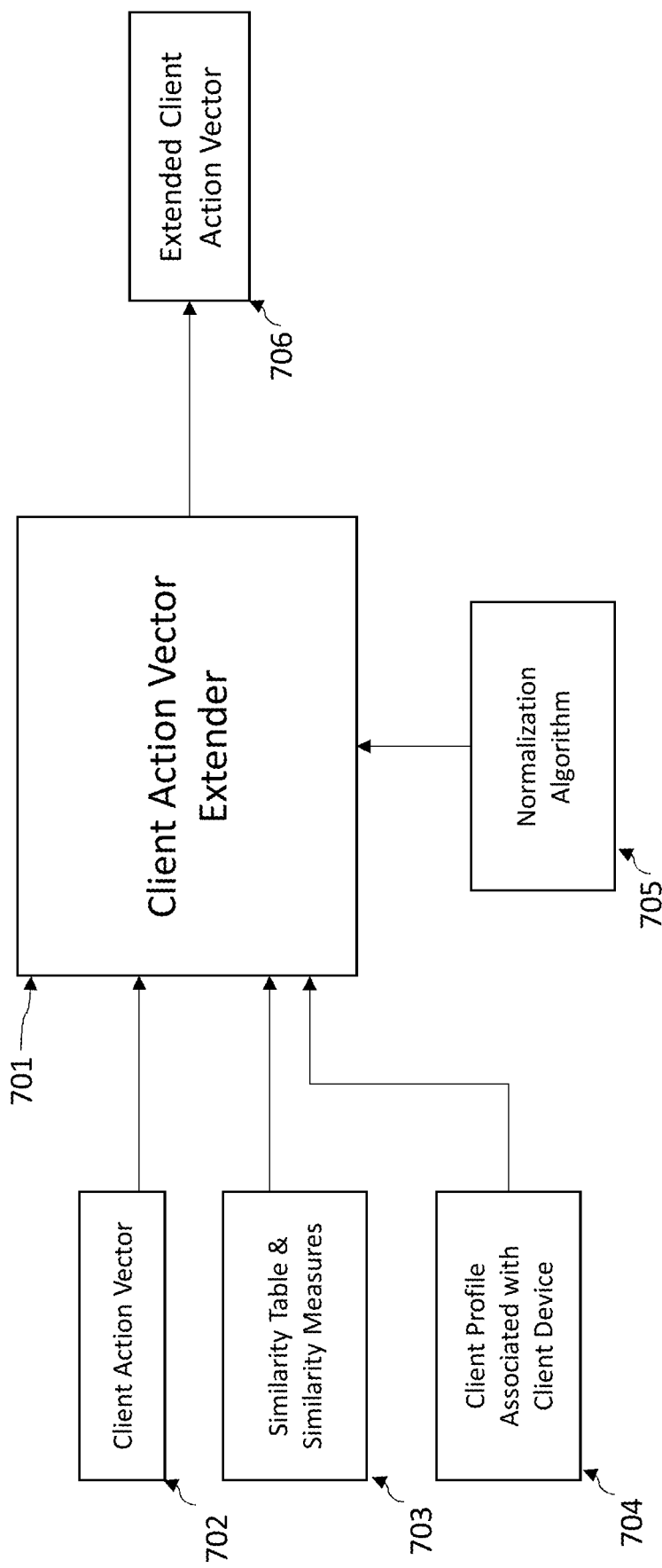
Figure 8:
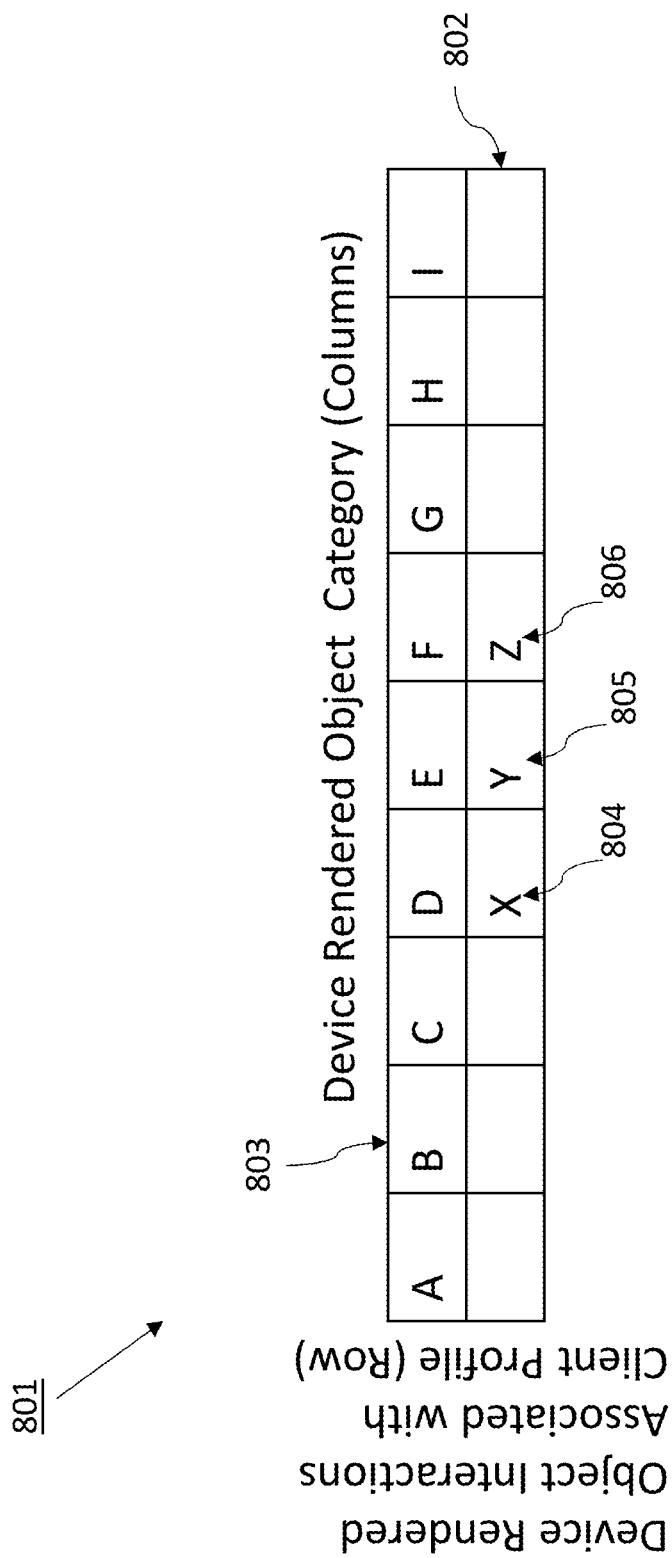
Figure 9:
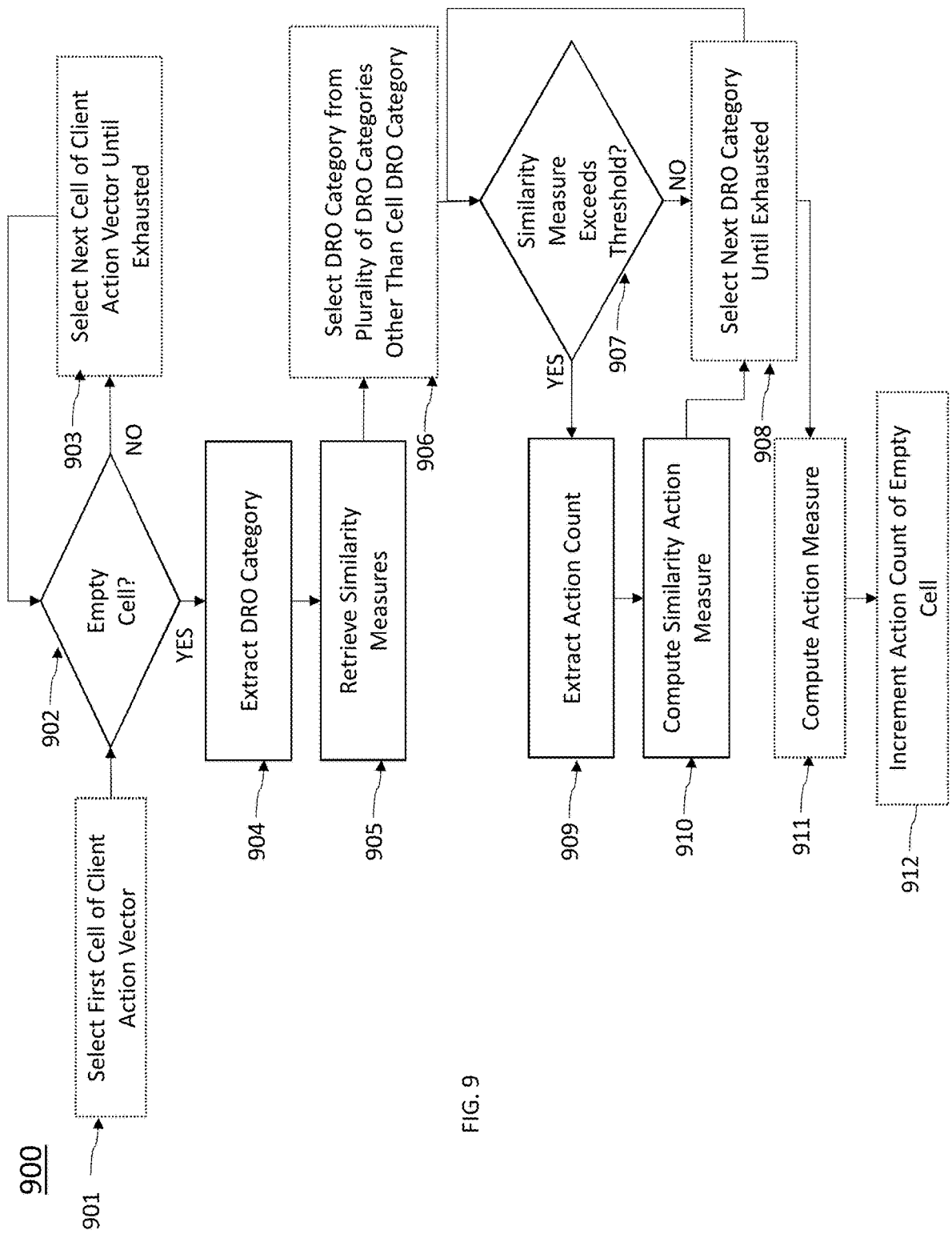

Having thus described the invention in general terms, reference will now be made to the accompanying drawings, which are not necessarily drawn to scale, and wherein:

FIG. 1 is a system architecture diagram of a system configured to practice embodiments of the present invention;

FIG. 2 is an exemplary schematic diagram of a computing entity according to one embodiment of the present invention;

FIG. 3 illustrates an exemplary similarity table generation data flow according to one embodiment of the present invention;

FIG. 4 illustrates an exemplary similarity table according to one embodiment of the present invention;

FIG. 5 illustrates an exemplary client action vector generation data flow according to one embodiment of the present invention;

FIG. 6 illustrates an exemplary client action vector according to one embodiment of the present invention;

FIG. 7 illustrates an exemplary client action vector extension data flow according to one embodiment of the present invention;

FIG. 8 illustrates an exemplary extended client action vector according to one embodiment of the present invention;

FIG. 9 illustrates an exemplary client action vector extension process according to one embodiment of the present invention'

Figure 10:
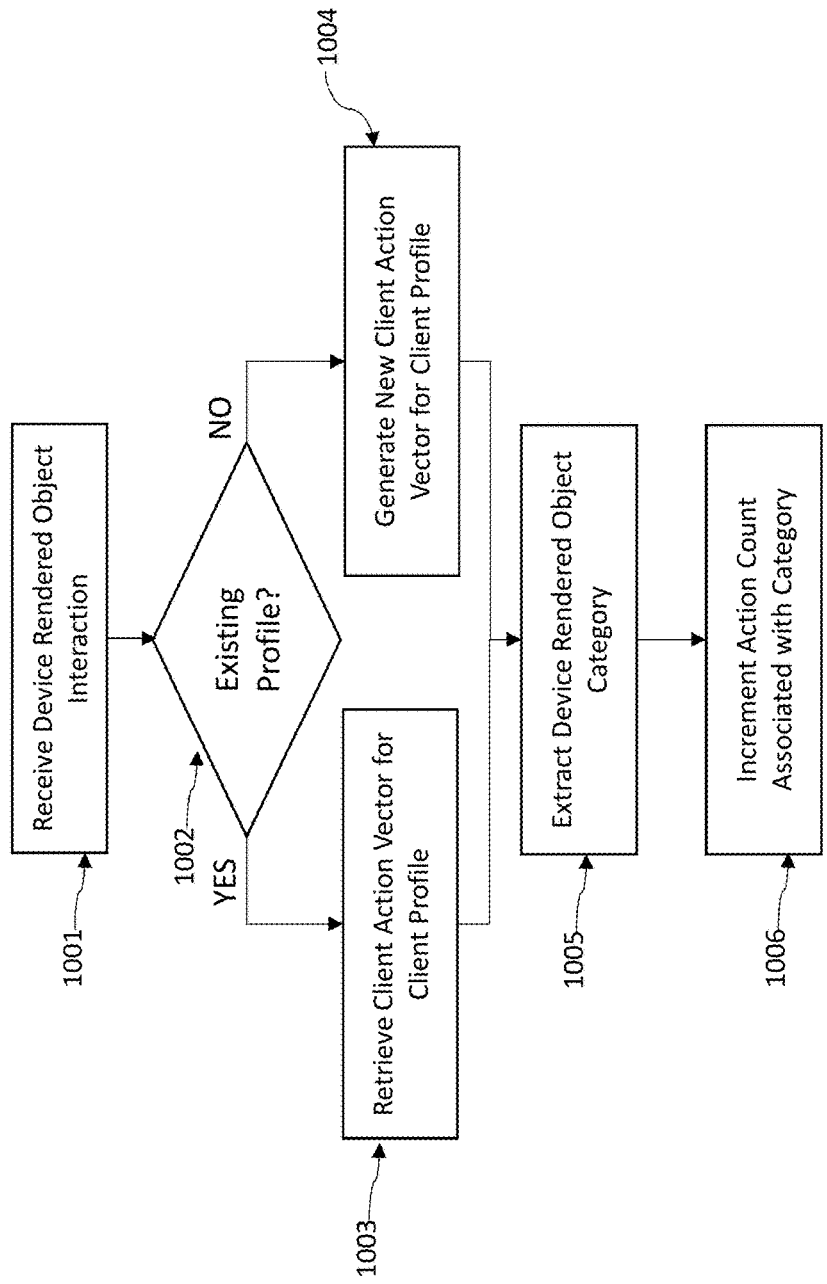
Figure 11:
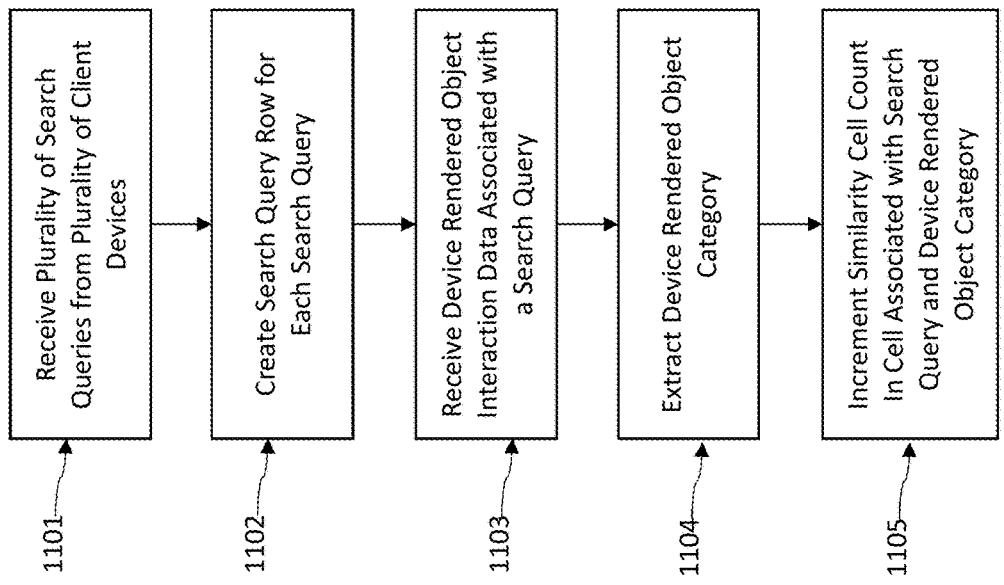
Figure 12:
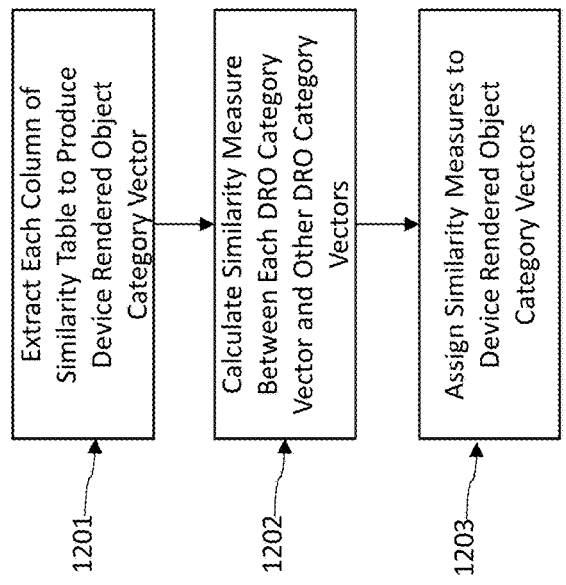

FIG. 10 illustrates an exemplary client action vector generation process according to one embodiment of the present invention;

FIG. 11 illustrates an exemplary similarity table generation process according to one embodiment of the present invention; and FIG. 12 illustrates an exemplary similarity measure calculation process according to one embodiment of the present invention.

DETAILED DESCRIPTION OF VARIOUS EMBODIMENTS

Various embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the invention generally relate to extending an action vector associated with a client device. For example, the methods, apparatus and computer program products described herein are operable to scan each client action vector cell of the client action vector to identify an empty client action vector cell, the client action vector associated with a client profile; upon identifying an empty client action vector cell, extract an empty client action vector cell device rendered object category; retrieve, from a similarity table, a similarity measure for each of the other device rendered object categories of the plurality of device rendered object categories, the similarity measure being in comparison to the empty client action vector cell device rendered object category; for each of the other device rendered object categories of the plurality of device rendered object categories having a similarity measure above a similarity threshold, extract an action count from the client action vector cell associated with the device rendered object category; compute a similarity action measure for the device rendered object category based at least on the action count and the similarity measure; and compute an action measure for the empty client action vector cell using at least one of the similarity action measures; and increment an action count in the empty client action vector cell based on the action measure.

Device rendered objects are selected for transmission to a client device as part of search results, the selection based upon data contained within a client action vector of a client profile associated with the client device. The client action vector is generated based upon device rendered object interaction activity performed by the client device. Where a client device has performed little to no device rendered object interaction activity for a particular device rendered object category, device rendered objects may not be selected for transmission to the client device for that particular device rendered object category in the future. Accordingly, a data store of device rendered objects may become unbalanced, thereby negatively impacting resources of a device rendered object system. Also, it is impossible to provide for enough system time and data storage in order to allow for the client device to interact with device rendered objects of every device rendered object category over time (i.e., in order to have each cell of a client action vector populated for a given client profile).

The inventors have identified that the system resources and time allocated to such device rendered object presentation selections based upon client action vectors are easily exhausted and compromised as a result of these challenges. The inventors have determined that the ability to extend a client action vector utilizing device rendered object interaction data associated with the client device as well as similarity measures between device rendered object categories would reduce the computing resources (e.g., processing power, processing time, data storage, transmission times) and time necessary to perform selection and transmission of device rendered objects.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

As used herein, the terms "user," "client," "consumer," and "customer" may be used interchangeably to refer, without limitation, to a client, customer, purchaser, shopper, user and the like who may be using a client device to receive and interact with a device rendered object.

The term "client profile" refers to a collection of preferences, settings, configurations, client device identifiers, data, and information associated with a specific user. A profile refers therefore to the explicit digital representation of a person's identity and other data or information associated with the user. In some embodiments, a client profile can be used to store a description of characteristics of the user and/or of the client device, as well as credentials, past behaviors, and preferences of the user.

The term "search query" refers to a query for electronic documents or digital content items submitted to a platform by a user utilizing a client device. The term "search results" refers to results returned from such a query. In some examples, a user using the client device may submit a query for "Japanese food" into an interface and the system may return a list of device rendered objects and/or URLs having keywords, metadata, or the like contained therein or associated therewith. The search results thus include the returned list of device rendered objects, all keywords and metadata associated therewith, and an arrangement or ranked order of the returned list.

The term "device rendered object" may be used to refer to a set of executable instructions that, when executed by a processor of a computing device, renders an object for display. An example of a device rendered object can be an instrument of a promotion. The instrument may be any type of gift card, tender, electronic certificate, medium of exchange, voucher, or the like that embodies terms of a promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value, and/or a residual value. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiration or other violation of a redemption parameter, the return or exchange value of the instrument and/or the like.

In embodiments, each device rendered object has associated data indicating one or more categories (such as a restaurant promotion, a spa promotion, a travel promotion, a local promotion, etc.), sub-categories (such as a sushi restaurant), location, hyper-locations, prices or the like. For example, an object may be associated with a gym, and the gym may be associated with category data such as "beauty, wellness, and healthcare," "food and drink," "leisure offers and activities" and/or "services." A gym may also have more than one location, and may be able to provide promotions in a variety of price ranges and time frames. The device rendered object may be further associated with sub-category data such as "Chinese food" or "Mexican food."

In embodiments, each search query has associated data indicating one or more categories, sub-categories, or the like. For example, a search query may be associated with category data such as "beauty, wellness, and healthcare," "food and drink," "leisure offers and activities" and/or "services." The search query may be further associated with sub-category data such as "Chinese food" or "Mexican food."

It is understood that while some embodiments described herein refer to a client action vector having categories associated therewith, the client action vector may have sub-categories associated therewith without departing from the scope of the present invention.

It is understood that while some embodiments described herein refer to a similarity table having categories associated therewith, the similarity table may have sub-categories associated therewith without departing from the scope of the present invention.

As used herein, the terms "device rendered object service" or "device rendered object system" may include a service that is accessible via one or more computing devices and that is operable to provide device rendered object services on behalf of one or more providers that are offering one or more instruments that are redeemable for goods, services, experiences and/or the like. In some examples, the device rendered object service may take the form of a redemption authority, a payment processor, a rewards provider, an entity in a financial network, a promoter, an agent and/or the like. As such, the device rendered object service is, in some example embodiments, configured to present one or more device rendered objects (e.g., promotions) to client devices, accept payments for device rendered objects from client devices, issue instruments upon acceptance of an object, participate in redemption, generate rewards, provide a point of sale device or service, issue payments to providers and/or otherwise participate in the exchange of goods, services or experiences for currency, value and/or the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of providing a good, service or experience to a consumer, facilitating the provision of a good service or experience to a consumer and/or otherwise operating in the stream of commerce. The "provider" or "merchant" need not actually market a product or service via the device rendered object service, as some merchants or providers may utilize the device rendered object service only for the purpose of gathering client profile information, vector activity information, similarity table information, or the like.

The term "device rendered object interaction" refers to electronic interaction with a device rendered object by a client device. In some examples, the device rendered object interaction may take the form of an accessing or selection of the device rendered object, a viewing of the device rendered object on an electronic display, a scrolling over the device rendered object, a retrieval of the device rendered object, a purchase transaction completed for the device rendered object, and/or the like.

In some embodiments, the interaction data may include various other interactions, including without limitation, mouse-over events and durations, the amount of time spent by the client device viewing particular content, the rate at which impressions of particular content result in sales associated with that content, demographic information associated with each particular client using the client device, data indicating other content accessed by the client device (e.g., browser cookie data), the time or date on which content was accessed, the frequency of impressions for particular content, a financial transaction performed between the client device and a device rendered object service/system associated with a particular device rendered object, associations between particular clients or client demographics and particular impressions, and/or the like.

The term "device rendered object interaction signal" refers to electronic indication that an interaction as defined above has occurred with respect to a particular device rendered object.

The term "client action vector" or "client activity vector" refers to a data structure used to stored information about actions performed by a client device associated with a client profile. In some embodiments, the actions performed by the client device are search queries. In some embodiments, the actions performed by the client device are device rendered object interactions. In some examples, the client action/activity vector may take the form of a vector, feature vector, linked list, array, record, tuple, a data structure containing data fields, and/or the like.

The term "client action vector cell" refers to a data field of a data structure used to store information about actions performed by a client device associated with a client profile (e.g., a client action vector as described above). In some examples, the client action vector cell may take the form of a cell, an array element, a node of a linked list, and/or the like.

The term "action count" refers to a number of search queries performed by a client device, associated with a client profile, for a particular category in a client action vector. In some embodiments, the action count is electronically stored in the data structure referred to herein as a client action vector cell.

The term "empty client action vector cell" refers to a cell of a client action vector storing an action count equivalent to 0. In some examples, the action count can be equivalent to 0 because the client device has not yet submitted a search query that is associated with the cell.

The term "empty client action vector cell category" refers to a category associated with a client action vector cell that has an action count value of 0. In some examples, the empty client action vector cell category may be "Chinese food" and/or the like.

The term "similarity table" refers to a data structure comprised of multiple data structures referred to herein as horizontal rows and vertical columns. A similarity table cell is a unit where a row and column intersect. In some examples, the similarity table may have rows representing search queries and columns representing device rendered object categories. In some examples, the similarity table may take the form of multiple vectors, multiple arrays, multiple linked lists, multiple records, a data structure containing multiple data fields, and the like.

The term "similarity measure" refers to a computer-generated value representing a measure of similarity between any two device rendered object categories of a similarity table. In some examples, the similarity measure may be calculated by extracting each device rendered object category column of the similarity table and performing a cosine similarity analysis on the columns to generate a plurality of similarity measures.

The term "similarity threshold" refers to a pre-defined minimum amount of similarity that is required between two device rendered object categories of a plurality of categories. In some examples, the similarity threshold may be 0.8, whereby any category having a similarity cell count below 0.8 will not be considered in calculating a similarity action measure and those categories having a similarity cell count of 0.8 or greater will be considered in calculating a similarity action measure.

The term "similarity action measure" refers to a computer-generated value for a particular device rendered object category that is calculated based upon the device rendered object category's similarity measure and the device rendered object category's action count.

The term "action measure" refers to a computer-generated value representing an artificial action count for a first device rendered object interaction category. In some examples, the action measure is based on a similarity action measure of a second device rendered object interaction category. In some examples, the similarity action measure is based on the similarity action measures associated with the first device rendered object interaction category and one or more of the plurality of device rendered object interaction categories.

The term "search query" refers to a text associated with a search query that has been requested/performed as defined above.

The term "search query row" refers to a row of a similarity table as defined above. The row is associated with a search query performed. For example, a row may represent the search query "Japanese food in Chicago" of search queries submitted by client devices.

The term "device rendered object category" refers to a category associated with a device rendered object as defined above.

The term "device rendered object category column" refers to a column of a similarity table as defined above. The column is associated with a particular category of device rendered objects. For example, a column may represent the category "Chinese food" of device rendered objects.

The term "similarity cell count" refers to a number representative of intersections between a search query row and a device rendered object category column of a similarity table. For example, a search query may have been performed for "Chinese food" and a client device interacted with a device rendered object associated with "Japanese food." In this representative example, the similarity cell at the intersection of the search query row for "Chinese food" and the device rendered object category column for "Japanese food" will have a similarity cell count that is incremented.

It should be appreciated that the term "programmatically expected" indicates machine prediction of occurrence of certain events. For example, a "programmatically expected" number of purchases by a first consumer is a number determined by machine prediction specifying the expected number of promotions that will be purchased by the first consumer.

As used herein, the term "likelihood" refers to a measure of probability for occurrence of a particular event. For example, the likelihood that a client device will interact with a device rendered object category may be a value associated with a specific scale. As another example, the likelihood that a client device will request a search query and interact with a device rendered object of a particular category may be a value associated with a specific scale. In some implementations, the machine predictions discussed above are based, at least in part, on the "likelihood" that an event will occur. Similarly, in some implementations, machine predictions are based on attributes associated with a client profile and/or an associated device rendered object category or search query.

It should be appreciated that the term "subset" describes a proper subset. A proper subset of set is portion of the set that is not equal to the set. For example, if elements A, B, and C belong to a first set, a subset including elements A and B is a proper subset of the first set. However, a subset including elements A, B, and C is not a proper subset of the first set.

Example System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system within which embodiments of the present invention may operate.

Client devices may access a device rendered object system 115 via a communications network 104 (e.g., the Internet, LAN, WAN, or the like) using client devices 101A-101N. The device rendered object system 115 may comprise a server 107 in communication with one or more databases or repositories 108, 109, 110, 111.

The server 107 may be embodied as a computer or computers as known in the art. The server 107 may provide for receiving of electronic data from various sources, including but not necessarily limited to the client devices 101A-101N. For example, the server 107 may be operable to receive and process search queries requested by the client devices 101A-101N. The server 107 may facilitate the generation and providing of various digital content objects associated with digital content object categories in response to the search queries.

The databases or repositories 108-111 may be embodied as a data storage device such as a Network Attached Storage (NAS) device or devices, or as a separate database server or servers. The databases 108-111 include information accessed and stored by the server 107 to facilitate the operations of the activity vector management system 115. For example, the databases 108-111 may include, without limitation, client profiles for users of the system 115, one or more similarity tables, client action vectors, categories, device rendered objects, category information, and/or the like.

Client action vector repository 110 may include a client profile for each user of the system 115. The client profile includes a client action vector specific to the user. A client profile may be created upon initial registration or interaction by a user with the system 115.

Similarity table repository 109 may include one or more similarity tables representing intersections of search queries and device rendered object categories for all client devices accessing the system 115. In some embodiments, the one or more similarity tables are constantly updated in real time.

Device rendered object repository 108 may include a plurality of device rendered objects for transmission to and display on client devices.

Category repository 111 may include mappings of device rendered objects to device rendered object categories.

The server 107 may comprise a similarity table generator 103 that is configured to generate a similarity table and similarity measures according to the description herein. The server 107 may further comprise a client action vector generator 104 that is configured to generate client action vectors according to the description herein. The server 107 may further comprise a client action vector extender 106 that is configured to extend a client action vector according to the description herein.

The client devices 101A-101N may be any computing device as defined above. Electronic data received by the server 107 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the system 115. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the system 115 via a web browser. As yet another example, the client device 101A-101N may include various hardware or firmware designed to interface with the system 115.

Examples of data flows for exchanging electronic information among one or more client devices 101A-101N and the system 115 is described below.

In the depicted embodiment, the one or more client devices 101A-101N are configured to generate a search query that is intended to produce search results. The search query is transmitted by wired or wireless communication over the communications network 104 to the system 115. In the depicted embodiment, the search query is provided to the search engine 105 of the server 107.

The server 107 utilizes search engine 105 to perform searches or queries based on the search query. The server 107 returns results that may include one or more device rendered objects retrieved from device rendered object repository 108. Client devices 101A-101N may interact with the device rendered objects.

It will be appreciated that repositories 108-111 may be one or more repositories, and may be part of or separate from server 107.

Example Apparatus for Implementing Embodiments of the Present Invention

The server 107 may be embodied by one or more computing systems, such as apparatus 200 shown in FIG. 2. The apparatus 200 may include a processor 202, a memory 201, input/output circuitry 204, communications circuitry 205, search circuitry 203, and client action vector management circuitry 206. The apparatus 200 may be configured to execute the operations described herein. Although the components 201-206 are described with respect to functional limitations, it should be understood that the particular implementations necessarily include the use of particular hardware. It should also be understood that certain of these components 201-206 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or coprocessor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 204 that may, in turn, be in communication with processor 202 to provide output to the user and, in some embodiments, to receive an indication of a user input. The input/output circuitry 204 may comprise a user interface and may include a display and may comprise a web user interface, a mobile application, a client device, a kiosk, or the like. In some embodiments, the input/output circuitry 204 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Search circuitry 203 includes hardware configured to receive search queries and to perform searches or queries based on such search queries. The search circuitry 203 may utilize processing circuitry, such as the processor 202, to perform these actions. The search circuitry 203 may send and/or receive data from client action vector management circuitry 206. In some implementations, the sent and/or received data may be client profile information, search query information, device rendered object interaction information, device rendered object category information, and the like. It should also be appreciated that, in some embodiments, the search circuitry 203 may include a separate processor, specially configured field programmable gate array (FPGA), or application specific interface circuit (ASIC). In some implementations, client action vector management circuitry 206, described below, may be sub-circuitry belonging to search circuitry 203. The search circuitry 203 may be implemented using hardware components of the apparatus configured by either hardware or software for implementing the functions described herein.

Client action vector management circuitry 206 includes hardware configured to manage client action vectors for one or more users associated with client profiles. The client action vector management circuitry may utilize processing circuitry, such as the processor 202, to perform these actions. However, it should also be appreciated that, in some embodiments, the client action vector management circuitry may include a separate processor, specially configured field programmable gate array (FPGA), or application specific interface circuit (ASIC) for performing the functions described herein. Circuitry 206 may be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor or other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium Example Processes for Managing and Extending a Client Action Vector FIG. 3 illustrates an exemplary similarity table generation data flow according to one embodiment of the present invention. A similarity table generator 301 receives data representing search query activity 302 and data representing device rendered object interaction 303. In some embodiments, the data representing search query activity 302 comprises text associated with the search query. In some embodiments, the data representing device rendered object interactions 303 comprises a device rendered object category associated with the device rendered objects with which interactions have occurred.

Similarity table generator 301 builds a similarity table 305 whereby the columns of the similarity table 305 represent device rendered object categories and the rows of the similarity table 305 represent search queries. A similarity count in a cell of the similarity table 305 represents an intersection of the search query and device rendered object category associated with the cell.

Similarity table generator 301 also performs a similarity analysis on each column of the similarity table 305 to produce a plurality of similarity measures (e.g., a similarity measure for each column or device rendered object category). Similarity table generator 301 performs the similarity analysis by extracting each column and performing a similarity analysis defined by similarity analysis type 304 on each column compared to each of the other columns. A similarity measure for a particular column is a measure of how similar the column is compared to another of the other columns of the similarity table 305.

FIG. 4 illustrates an exemplary similarity table according to one embodiment of the present invention. Similarity table 401 comprises a plurality of columns, each column associated with a device rendered object category (shown by box 402 in FIG. 4). Similarity table 401 comprises a plurality of rows, each row associated with a search query (shown by box 403 in FIG. 4). Similarity table 401 comprises a plurality of cells that represent the intersection of search queries and device rendered object categories. For example, similarity cell 404 contains a count "X" representing a number of times (e.g., X=5) a device rendered object interaction associated with category "F" has resulted from a search query "B."

FIG. 5 illustrates an exemplary client action vector generation data flow according to one embodiment of the present invention. Client action vector generator 501 receives data representing device rendered object interaction signals performed by the client device 502, and a client profile associated with the client device 503. The client action vector 505 includes data fields or cells representative of the number of times a client device has interacted with device rendered objects of each device rendered object category of a plurality of device rendered object categories.

FIG. 6 illustrates an exemplary client action vector according to one embodiment of the present invention. Client action vector 601 comprises a plurality of columns, each column associated with a device rendered object category 603 (e.g., A, B, C . . . I, in FIG. 6). Client action vector 601 comprises a row 602, where the row 602 is associated with device rendered object interactions by a client profile. Client action vector 601 comprises a plurality of cells that represent the number of times a client device associated with the client profile has interacted with device rendered objects of each device rendered object category. For example, client action vector cell 604 contains a count "X" representing a number of times (e.g., X=5) a device rendered object associated with category "F" has been interacted with by the client device associated with the client profile. Also, for example, client action vector cells 605 and 606 are "empty," meaning the client device associated with the client profile has not interacted with device rendered objects associated with categories "E" or "F."

FIG. 7 illustrates an exemplary client action vector extension data flow according to one embodiment of the present invention. A client action vector extender 701 receives as input a client action vector 702 associated with a client profile (utilizing client device) as well as a similarity table 703 (and similarity measures) associated with all client profiles across the device rendered object system. The client profile 704 associated with the client device is also received as input by the client action vector extender 701. Utilizing a received normalization algorithm 705, client action vector extender 701 produces an extended client action vector 706.

FIG. 8 illustrates an exemplary extended client action vector according to one embodiment of the present invention. Client action vector 801 comprises a plurality of columns, each column associated with a device rendered object category 803 (e.g., A, B, C . . . I, in FIG. 8). Client action vector 801 comprises a row 802, where the row 802 is associated with a client profile. Client action vector 801 comprises a plurality of cells that represent the number of times a client device associated with the client profile has interacted with device rendered objects associated with each device rendered object category. For example, client action vector cell 804 contains a count "X" representing a number of times (e.g., X=5) a device rendered object associated with category "F" has been interacted with by the client device associated with the client profile. Because, from FIG. 6, it may have been determined that the client device associated with the client profile had not interacted with device rendered objects associated with categories "E" or "F," a client action vector extender 701 can be utilized to provide numbers for the empty cells. As such, previously empty cell 805 now includes a number "Y" representing a number of times (e.g., Y=10) a device rendered object associated with category "E" might have been interacted with by the client device associated with the client profile. Similarly, previously empty cell 806 now includes a number "Z" representing a number of times (e.g., Z=9) a device rendered object associated with category "F" might have been interacted with by the client device associated with the client profile.

FIG. 9 illustrates an exemplary client action vector extension process according to one embodiment of the present invention. A first cell or field of a client action vector is selected 901, and if it is not empty 902, the next cell or field of the client action vector is selected 903 until the entire client action vector has been traversed. Upon identifying an empty cell 902, a device rendered object category is extracted 904 and the similarity measures between the device rendered object category and each of the other categories of a plurality of device rendered object categories are retrieved 905. For each device rendered object category other than the extracted device rendered object category 906, if the similarity measure of the category as compared to the extracted device rendered object category is at or above a pre-defined similarity threshold 907, an action count is extracted from a cell of the client action vector associated with the device rendered object category 909. A similarity action measure is computed based on the action count and the similarity measure 910. If a similarity measure does not meet or exceed the pre-defined threshold, the next device rendered object category is selected until all device rendered object categories are exhausted 908. Similarly, after computing a similarity action measure 910 for a device rendered object category, a next device rendered object category is selected until all device rendered object categories are exhausted 908.

Using one or more of the computed similarity action measures, an action measure for the empty client action vector cell is computed 911. An action count of the empty client action vector cell is incremented 912 to match the action measure.

FIG. 10 illustrates an exemplary client action vector generation process according to one embodiment of the present invention. A device rendered object interaction signal is received 1001 from a client device. If the client device is associated with an existing profile 1002, a client action vector for the client profile is retrieved 1003. If the client device is not associated with an existing profile 1002, a new client action vector as well as a new client profile are generated for the client device 1004. A device rendered object category is extracted 1005 from the device rendered object interaction signal, and an action count of a client action vector cell in the client action vector associated with the device rendered object category is incremented 1006.

FIG. 11 illustrates an exemplary similarity table generation process according to one embodiment of the present invention. A plurality of search queries is received from a plurality of client devices 1101. For each received search query, a search query row is generated 1102. Also for each search query, any device rendered object interaction data associated with the search query is received 1103 and a device rendered object category is extracted 1104. For each search query, a similarity count in a cell representing an intersection between the search query and associated extracted device rendered object category is incremented 1105.

FIG. 12 illustrates an exemplary similarity measure calculation process according to one embodiment of the present invention. According to one embodiment, each column of a similarity table is extracted 1201. It will be appreciated that each column of the similarity table may be referred to as a vector, and each device rendered object category is associated with its own vector. A similarity measure is calculated for each column 1202, where the similarity measure is a comparison between each column and the other columns of the similarity table. Similarity measures are then assigned to the device rendered object category associated with the column 1203.

Computational Details

A client action vector for a client device associated with a client profile u can be denoted as $UDA_u$:

$$UDA_u = <A_{u1}, A_{u2}, \ldots, A_{un}> \quad (1)$$

where $A_{ui}$ is a tuple of two floats: $<I_u(i), C_u(i)>$. $I_u(i)$ represents a number of times device rendered objects in device rendered object category i have been presented to a client device associated with the client profile. $C_u(i)$ represents a number of times a client device associated with the client profile has interacted with device rendered objects associated with device rendered object category i. An action count for device rendered object category i for client profile u is can be denoted as:

$$CTR_u(i) = \frac{C_u(i)}{I_u(i)} \quad (2)$$

For all client profiles within a device rendered object system, an all client action vector can be denoted as $UDA_{all}$ and an all client profile action count for device rendered object category i can be denoted as $CTR_{all}(i)$. For device rendered object category i, a set of similar device rendered object categories can be denoted as $S_i(t)$, where t is a similarity threshold.

For device rendered object category i and device rendered object category j, a similarity measure can be represented as $CM_{sim}(i,j)$.

For device rendered object category i, a similarity ratio can be defined as:

$$SIM_u(i) = \frac{CTR_u(i)}{CTR_{all}(i)} \quad (3)$$

To compute a similarity ratio for an empty client action vector cell, device rendered object category similarities can be used (i.e., a similarity measures).

Action counts from client action vector cells associated with one device rendered object category, e.g., j, can be "converted" to similarity action measures for an empty client action vector cell associated with a second device rendered object category, e.g., i. This similarity action measure can be computed according to the following:

$$\widetilde{CTR}_{u,j}(i) = \frac{C_u(j) * CM_{sim}(i,j)}{I_u(j)} \quad (4)$$

For a given device rendered object category, i, a similarity action measure can be computed from all similar categories of i, $S_i(t)$, according to the following:

$$\widetilde{CTR}_u(i, S_i(t)) = \Sigma_{k \in S_i(t)} p_k \widetilde{CTR}_{u,k}(i) \quad (5)$$

where $$p_k = \frac{T(I_u(k))}{\sum_{l \in S_i(t)} T(I_u(l))} \quad (6)$$

and where T is a transformation function to transform a number of times device rendered objects in device rendered object category i that have been presented to a client device associated with the client profile. Possible choices for T include:

An identical transformation, or $T(x)=x$. This means that a proportion of number of times device rendered objects in category i have been presented to the client device is used as the weight for the category.

A nonlinear transformation, or $T(x)=\tanh(x/\beta)$. This transformation gives almost equal weights when the number of times device rendered objects in category i have been presented to the client device is larger than certain threshold, which is approximately controlled by $\beta$. This reflects the idea that when the number of times device rendered objects in category i have been presented to the client device are large enough (e.g., >5), they are equally reliable and they should get similar weights.

A step function. This gives equal weights to all categories whose number of times device rendered objects in the category have been presented to the client device is larger than a certain threshold and zero weights otherwise. This means activity data of similar categories is not used if the number of times device rendered objects in the categories have been presented to the client device are not reliable.

In some embodiments, the client action vector associated with a client profile u might have an existing action count for device rendered object category i, in which case a similarity action measure for the client profile u from similar device rendered object categories can be combined with the existing action count:

$$\text{if } CTR_u(i) < \widehat{CTR}_u(i, S_i(t)), \tag{7}$$

$$\text{then } \widehat{CTR}_u(i) = w_1 CTR_u(i) + w_2 \widehat{CTR}_u(i, S_i(t)) \tag{8}$$

$$\text{else } \widehat{CTR}_u(i) = CTR_u(i) \tag{9}$$

where $$w_1 = \frac{I_u(i)}{\hat{I}_u(S_i(t)) + I_u(i)} \tag{10}$$

and $$w_2 = 1 - w_1 \tag{11}$$

and where $$\hat{I}_u(S_i(t)) = \frac{\sum_{k \in S_i(t)} I_u(k)}{|S_i(t)|} \tag{eqn. 12}$$

is the average number of times device rendered objects have been displayed to the client device from similar device rendered object categories to i. The similarity action measure is only computed for category i if the similarity action measure from similar categories is larger than the original action count.

For client profile u and device rendered object category i, an updated similarity ratio can be defined as:

$$\widehat{SIM}_u(i) = \frac{\widehat{CTR}_u(i)}{CTR_{all}(i)} \tag{13}$$

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for extending a client action vector, the client action vector comprising a plurality of client action vector cells, each client action vector cell associated with a different device rendered object category of a plurality of device rendered object categories, the apparatus comprising at least one processor and at least one memory including computer program code, the at least one memory and the computer program code configured to, with the at least one processor, cause the apparatus to:

scan each client action vector cell of the client action vector to identify an empty client action vector cell, the client action vector associated with a client profile;

upon identifying the empty client action vector cell, extract an empty client action vector cell device rendered object category, wherein the empty client action vector cell device rendered object category represents a device rendered object category associated with the empty client action vector cell;
retrieve, from a similarity table, a respective similarity measure for each of the other device rendered object categories of the plurality of device rendered object categories, the respective similarity measure being in comparison to the empty client action vector cell device rendered object category;
for each of the other device rendered object categories of the plurality of device rendered object categories having a similarity measure above a similarity threshold,
extract a respective action count from a respective client action vector cell associated with a respective device rendered object category, wherein the respective action count corresponds to a number of actions performed by one or more client devices associated with the client profile for the respective device rendered object category; and
compute a respective similarity action measure for the respective device rendered object category based at least on the respective action count and the respective similarity measure;
compute an action measure for the empty client action vector cell using at least one of the respective similarity action measures; and
determine an action count for the empty client action vector cell of the client action vector based on the action measure associated with the number of actions performed by the one or more client devices;
select, using the action count determined based on the action measure associated with the number of actions performed by the one or more client devices, one or more device rendered objects from the client action vector; and
transmit the one or more device rendered objects to at least one client device, wherein the at least one client device is configured to render the one or more device rendered objects via an electronic interface of the at least one client device.

2. The apparatus of claim 1, wherein the client action vector is generated based on a device rendered object interaction signal received from a client device, wherein the client device is associated with the client profile, wherein the device rendered object interaction signal is indicative of the client device having electronically interacted with a device rendered object, and wherein the at least one memory and the computer program code configured to, with the at least one processor, further cause the apparatus to:
extract a first device rendered object category associated with the device rendered object; and
increment a particular action count in a client action vector cell associated with the first device rendered object category.

3. The apparatus of claim 1, wherein the at least one memory and the computer program code configured to, with the at least one processor, further cause the apparatus to:
generate the similarity table, wherein the similarity table has a plurality of columns, each column associated with a different device rendered object category of the plurality of device rendered object categories, and wherein the similarity table has a plurality of rows, each row associated with a different search query.

4. The apparatus of claim 3, wherein each device rendered object category column contains a row for every search query and each search query row contains a column for every device rendered object category.

5. The apparatus of claim 3, wherein the similarity table comprises a plurality of similarity cells and each similarity cell is associated with a row and a column.

6. The apparatus of claim 3, wherein the similarity table is generated based on a plurality of search queries received from the one or more client devices, and wherein the at least one memory and the computer program code configured to, with the at least one processor, further cause the apparatus to:
for each received search query,
generate a search query row;
upon receiving a device rendered object interaction signal associated with the search query,
extract a device rendered object interaction category; and
increment a similarity cell count in a cell associated with both the search query and the device rendered object interaction category.

7. The apparatus of claim 6, wherein the at least one memory and the computer program code configured to, with the at least one processor, further cause the apparatus to:
extract each column of the similarity table and the device rendered object interaction category associated therewith;
for each column,
calculate a similarity measure between the column and each of the other columns of the similarity table; and
assign the similarity measures to the device rendered object interaction category.

8. The apparatus of claim 7, wherein the similarity measure is calculated using a cosine similarity.

9. A system for extending a client action vector, the client action vector comprising a plurality of client action vector cells, each client action vector cell associated with a different device rendered object category of a plurality of device rendered object categories, the system comprising a server in communication with a network, the server comprising at least one processor and at least one memory including computer program code, the at least one memory and the computer program code configured to, with the at least one processor, cause the server to:
scan each client action vector cell of the client action vector to identify an empty client action vector cell, the client action vector associated with a client profile;
upon identifying the empty client action vector cell,
extract an empty client action vector cell device rendered object category, wherein the empty client action vector cell device rendered object category represents a device rendered object category associated with the empty client action vector cell;
retrieve, from a similarity table, a respective similarity measure for each of the other device rendered object categories of the plurality of device rendered object categories, the respective similarity measure being in comparison to the empty client action vector cell device rendered object category;
for each of the other device rendered object categories of the plurality of device rendered object categories having a similarity measure above a similarity threshold,
extract a respective action count from a respective client action vector cell associated with a respective device rendered object category, wherein the respective action count corresponds to a number of actions performed by one or more client devices associated with the client profile for the respective device rendered object category; and compute a respective similarity action measure for the respective device rendered object category based at least on the respective action count and the respective similarity measure;

compute an action measure for the empty client action vector cell using at least one of the respective similarity action measures; and determine an action count for the empty client action vector cell of the client action vector based on the action measure associated with the number of actions performed by the one or more client devices;

select, using the action count determined based on the action measure associated with the number of actions performed by the one or more client devices, one or more device rendered objects from the client action vector; and transmit the one or more device rendered objects to at least one client device, wherein the at least one client device is configured to render the one or more device rendered objects via an electronic interface of the at least one client device.

10. The system of claim 9, wherein the client action vector is generated based on a device rendered object interaction signal received from a client device, wherein the client device is associated with a client profile, wherein the device rendered object interaction signal is indicative of the client device having selected a device rendered object, and wherein the at least one memory and the computer program code configured to, with the at least one processor, further cause the apparatus to:

extract a first device rendered object category from the device rendered object; and increment a particular action count in a client action vector cell associated with the first device rendered object category.

11. The system of claim 9, the at least one memory and the computer program code configured to, with the at least one processor, cause the server to:

generate the similarity table, wherein the similarity table has a plurality of columns, each column associated with a different device rendered object category of the plurality of device rendered object categories, and wherein the similarity table has a plurality of rows, each row associated with a different search query.

12. The system of claim 11, wherein the similarity table comprises a plurality of similarity cells and each similarity cell is associated with a row and a column.

13. The system of claim 11, wherein each device rendered object category column contains a row for every search query and each search query row contains a column for every device rendered object category.

14. The system of claim 11, wherein the similarity table is generated based on a plurality of search queries received from the one or more client devices, and wherein the at least one memory and the computer program code configured to, with the at least one processor, further cause the apparatus to:

for each received search query,
generate a search query row;
upon receiving a device rendered object interaction signal associated with the search query,
extract a device rendered object interaction category; and
increment a similarity cell count in a cell associated with both the search query and the device rendered object interaction category.

15. The system of claim 14, wherein the at least one memory and the computer program code configured to, with the at least one processor, further cause the apparatus to:

extract each column of the similarity table and the device rendered object interaction category associated therewith;
for each column,
calculate a similarity measure between the column and each of the other columns of the similarity table; and
assign the similarity measures to the device rendered object interaction category.

16. The system of claim 15, wherein the similarity measure is calculated using a cosine similarity.

17. A computer-implemented method for extending a client action vector, the client action vector comprising a plurality of client action vector cells, each client action vector cell associated with a different device rendered object category of a plurality of device rendered object categories, method comprising:

scanning, using one or more processors, each client action vector cell of the client action vector to identify an empty client action vector cell, the client action vector associated with a client profile;

upon identifying, using the one or more processors, the empty client action vector cell, extracting, using the one or more processors, an empty client action vector cell device rendered object category, wherein the empty client action vector cell device rendered object category represents a device rendered object category associated with the empty client action vector cell;

retrieving, using the one or more processors and from a similarity table, a respective similarity measure for each of the other device rendered object categories of the plurality of device rendered object categories, the respective similarity measure being in comparison to the empty client action vector cell device rendered object category;

for each of the other device rendered object categories of the plurality of device rendered object categories having a similarity measure above a similarity threshold, extracting, using the one or more processors, a respective action count from the client action vector cell associated with a respective device rendered object category, wherein the respective action count corresponds to a number of actions performed by one or more client devices associated with the client profile for the respective device rendered object category; and computing, using the one or more processors, a respective similarity action measure for the respective device rendered object category based at least on the respective action count and the respective similarity measure;

computing, using the one or more processors, an action measure for the empty client action vector cell using at least one of the respective similarity action measures; and determining, using the one or more processors, an action count for the empty client action vector cell of the client action vector based on the action measure associated with the number of actions performed by the one or more client devices;

selecting, using the one or more processors and the action count determined based on the action measure associated with the number of actions performed by the one or more client devices, one or more device rendered objects from the client action vector; and transmitting, using the one or more processors, the one or more device rendered objects to at least one client device, wherein the at least one client device is configured to render the one or more device rendered objects via an electronic interface of the at least one client device.

18. The method of claim 17, further comprising:
receiving, using the one or more processors, a device rendered object interaction signal from a client device, the client device associated with the client profile, wherein the device rendered object interaction signal is indicative of the client device having selected a device rendered object;

extracting, using the one or more processors, a first device rendered object category from the device rendered object; and incrementing, using the one or more processors, a particular action count in a client action vector cell associated with the first device rendered object category.

19. The method of claim 17, further comprising:
generating, using the one or more processors, the similarity table, wherein the similarity table has a plurality of columns, each column associated with a different device rendered object category of the plurality of device rendered object categories, and wherein the similarity table has a plurality of rows, each row associated with a different search query.

20. The method of claim 19, wherein the similarity table comprises a plurality of similarity cells and each similarity cell is associated with a row and a column.

21. The method of claim 19, wherein each device rendered object category column contains a row for every search query and each search query row contains a column for every device rendered object category.

22. The method of claim 19, further comprising:
receiving, using the one or more processors, a plurality of search queries from the one or more client devices;

for each received search query, generating, using the one or more processors, a search query row;

upon receiving, using the one or more processors, a device rendered object interaction signal associated with the search query, extracting, using the one or more processors, a device rendered object interaction category; and incrementing, using the one or more processors, a similarity cell count in a cell associated with both the search query and the device rendered object interaction category.

23. The method of claim 22, further comprising:
extracting, using the one or more processors, each column of the similarity table and the device rendered object interaction category associated therewith;

for each column, calculating, using the one or more processors, a similarity measure between the column and each of the other columns of the similarity table; and assigning, using the one or more processors, the similarity measures to the device rendered object interaction category.

24. The method of claim 23, wherein the similarity measure is calculated using a cosine similarity.

* * * * *